United States Patent
Nigam et al.

(10) Patent No.: US 9,337,649 B2
(45) Date of Patent: May 10, 2016

(54) FAULT PROCESSING SYSTEM

(75) Inventors: Atul Nigam, Suwanee, GA (US);
Ramon Juan San Andres, Duluth, GA (US)

(73) Assignee: General Electric Company, Schenectady, NY (US)

( * ) Notice: Subject to any disclaimer, the term of this patent is extended or adjusted under 35 U.S.C. 154(b) by 716 days.

(21) Appl. No.: 13/159,678

(22) Filed: Jun. 14, 2011

(65) Prior Publication Data
US 2012/0324271 A1    Dec. 20, 2012

(51) Int. Cl.
| G06F 11/00 | (2006.01) |
| H02H 7/26 | (2006.01) |
| G06F 11/07 | (2006.01) |
| H02H 1/00 | (2006.01) |
| H02J 13/00 | (2006.01) |

(52) U.S. Cl.
CPC ............ *H02H 7/262* (2013.01); *G06F 11/0784* (2013.01); *G06F 11/0793* (2013.01); *H02H 1/0084* (2013.01); *H02H 1/0092* (2013.01); *H02J 13/0079* (2013.01); *Y02E 60/725* (2013.01); *Y04S 10/20* (2013.01); *Y04S 10/525* (2013.01)

(58) Field of Classification Search
CPC ............ G06F 11/0784; H02H 1/0061; H02H 1/0092; H02H 7/30; H02H 7/261; H02H 7/262; H02J 13/0079
USPC .................. 714/2, 4.11, 39, 14; 713/310, 182; 709/225; 700/295
See application file for complete search history.

(56) References Cited

U.S. PATENT DOCUMENTS

| 6,347,027 | B1* | 2/2002 | Nelson et al. .................... 361/64 |
| 7,577,092 | B2 | 8/2009 | San Andres et al. |
| 7,921,350 | B2 | 4/2011 | Eklund |
| 2002/0124082 | A1* | 9/2002 | San Andres et al. .......... 709/225 |
| 2002/0138775 | A1* | 9/2002 | Hammond et al. ........... 713/310 |
| 2004/0158772 | A1* | 8/2004 | Pan et al. ......................... 714/14 |
| 2004/0230547 | A1* | 11/2004 | Wookey et al. ................. 706/47 |
| 2004/0230548 | A1* | 11/2004 | Wookey .......................... 706/47 |
| 2004/0230597 | A1* | 11/2004 | Wookey ........................ 707/101 |
| 2005/0021660 | A1* | 1/2005 | San Andres et al. .......... 709/216 |
| 2005/0251296 | A1* | 11/2005 | Tracy Nelson et al. ....... 700/292 |
| 2006/0026451 | A1* | 2/2006 | Voigt ................................. 714/2 |
| 2008/0133812 | A1* | 6/2008 | Kaiser et al. .................. 710/263 |
| 2009/0259346 | A1* | 10/2009 | Reed et al. .................... 700/295 |
| 2010/0152910 | A1* | 6/2010 | Taft ............................... 700/286 |

OTHER PUBLICATIONS

Liu, "An Expert System Operational Aid for Restoration and Loss Reduction of Distribution Systems", May 1988, IEEE, vol. 3, No. 2, p. 619-626.*

* cited by examiner

*Primary Examiner* — Bryce Bonzo
*Assistant Examiner* — Jeison C Arcos
(74) *Attorney, Agent, or Firm* — Sutherland Asbill & Brennan LLP (57) ABSTRACT

Aspects of the invention provide for a fault processing system. In one embodiment, the fault processing system includes: a first processing engine wrapper having: an inbound pipe configured to obtain a first claimcheck data packet; a processing engine component configured to: process a first context message derived from the first claimcheck data packet according to a fault rule selected from: a fault detection rule, a fault location rule, a fault isolation rule, or a fault restoration rule; and generate a second context message, the second context message including data processed according to the selected fault rule; and an outbound pipe configured to provide a second claimcheck data packet derived from the second context message.

17 Claims, 5 Drawing Sheets

FAULT PROCESSING SYSTEM

BACKGROUND OF THE INVENTION

The subject matter disclosed herein relates to a fault processing system. Specifically, the subject matter disclosed herein relates to a power system fault processing system utilizing an architecture of processing engines and message queues to process fault data.

Fault detection, isolation and restoration (or, FDIR) is a time-sensitive process utilized by some electric power suppliers in order to provide quality customer service and meet reliability requirements. While FDIR can provide many benefits to an electric power supplier, it also requires extensive processing power. This can be particularly true where restoration plans need to be generated to meet particular performance goals.

Current approaches to FDIR include: a) monolithic processes, or b) object oriented frameworks and associated libraries. Both of these approaches offer limited flexibility, are difficult to maintain, are not easily scalable, usually do not fully exploit multithreading, and do not take full advantage of modern distributed event-driven architectures.

BRIEF DESCRIPTION OF THE INVENTION

A fault processing system is disclosed. In one embodiment, the fault processing system includes: a first processing engine wrapper having: an inbound pipe configured to obtain a first claimcheck data packet; a processing engine component configured to: process a first context message derived from the first claimcheck data packet according to a fault rule selected from: a fault detection rule, a fault location rule, a fault isolation rule, or a fault restoration rule; and generate a second context message, the second context message including data processed according to the selected fault rule; and an outbound pipe configured to provide a second claimcheck data packet derived from the second context message.

A first aspect of the invention includes a fault processing system having: a first processing engine wrapper having: an inbound pipe configured to obtain a first claimcheck data packet; a processing engine component configured to: process a first context message derived from the first claimcheck data packet according to a fault rule selected from: a fault detection rule, a fault location rule, a fault isolation rule, or a fault restoration rule; and generate a second context message, the second context message including data processed according to the selected fault rule; and an outbound pipe configured to provide a second claimcheck data packet derived from the second context message.

A second aspect of the invention includes a fault processing system having: a series of connected processing engine wrappers collectively configured to process a fault in a power system, each of the processing engine wrappers having: an inbound pipe configured to obtain a first claimcheck data packet; a processing engine component configured to: process a first context message derived from the first claimcheck data packet according to only one fault rule selected from: a fault detection rule, a fault location rule, a fault isolation rule, or a fault restoration rule; and generate a second context message, the second context message including data processed according to the selected fault rule; and an outbound pipe configured to provide a second claimcheck data packet derived from the second context message to a subsequent processing engine wrapper in the series of processing engine wrappers.

A third aspect of the invention includes a system comprising: at least one computing device adapted to process a power system fault by performing actions comprising: obtaining an inbound event context message indicating a fault in a power system component; obtaining circuit information about a circuit surrounding the power system component; providing instructions for normalizing the circuit surrounding the power system component; validating the event context message; determining a plurality of possible fault locations in the normalized circuit surrounding the power system component; generating an isolation plan for at least one of the plurality of possible fault locations; identifying a plurality of tie switches capable of providing restoration power to a portion of the power system downstream of the normalized circuit; obtaining circuit information about a circuit surrounding each of the plurality of tie switches; normalizing the circuit surrounding each of the plurality of tie switches; and generating a power restoration plan utilizing at least one of the plurality of tie switches based upon a predetermined restoration metric.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted, the subject matter disclosed herein relates to a fault processing system. Specifically, the subject matter disclosed herein relates to a power system fault processing system utilizing engines to process fault data. A fault in the power system results in a set of messages, which are routed through a system of pipes and corresponding processing engines. Each processing engine receives an inbound context message on its inbound pipe, performs a specific fault-processing function, and sends an outbound context message via its outbound pipe. In order to minimize the amount of data transferred between each respective processing engine, and consequently, through the fault processing system as a whole, a claim check pattern can be used during routing of messages. This may involve the use of, e.g., splitters, aggregators and normalizers.

Fault detection, isolation and restoration (or, FDIR) is a time-sensitive process utilized by some electric power supplier in order to provide quality customer service and meet reliability requirements. While FDIR can provide many benefits to an electric power supplier, it also requires extensive processing power. This can be particularly true where restoration plans need to be generated to meet particular performance goals.

Conventional approaches to FDIR include: a) monolithic processes, which are consequently slow; or b) use object oriented frameworks and associated libraries, which can be cumbersome. In contrast to conventional FDIR systems, aspects of the invention provide for a fault processing system configured to utilize processing engines to process portions of an event context message indicating a fault in a power system component.

In one embodiment, the fault processing system of the present invention includes: a first processing engine wrapper having: an inbound pipe configured to obtain a first claimcheck data packet; a processing engine component configured to: process a first context message derived from the first claimcheck data packet according to a fault rule selected from: a fault detection rule, a fault location rule, a fault isolation rule, or a fault restoration rule; and generate a second context message, the second context message including data processed according to the selected fault rule; and an outbound pipe configured to provide a second claimcheck data packet derived from the second context message.

Figure 1:
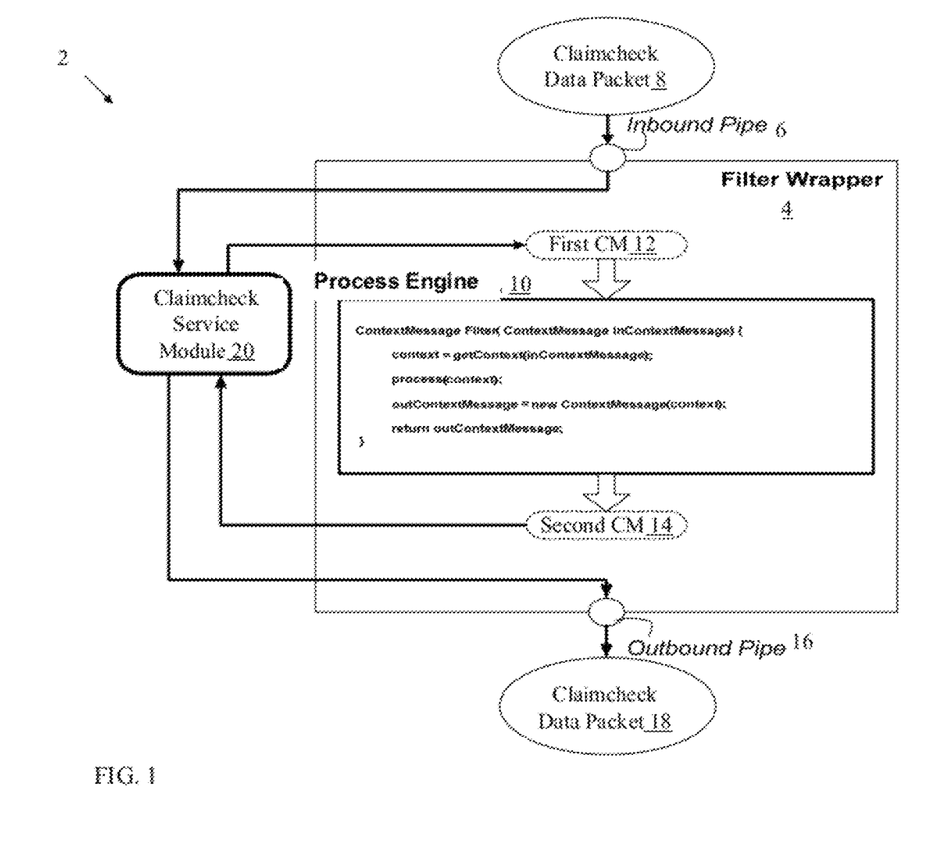
FIG. 1 shows an illustrative schematic view of a fault processing system according to embodiments of the invention.

Turning to FIG. 1, a fault processing system 2 is shown according to embodiments of the invention. In one embodiment, the fault processing system 2 includes a first processing engine wrapper (or, first wrapper) 4. The first wrapper 4 includes an inbound pipe 6 configured to obtain a first claimcheck data packet 8. Additionally, the first wrapper 4 includes a processing engine 10 configured to process a first context message (CM) 12 derived from the first claimcheck data packet 8 according to a fault rule selected from: a fault detection rule, a fault location rule, a fault isolation rule, or a fault restoration rule. Further, the first wrapper 4 is configured to generate a second context message 14 including data processed according to the selected fault rule. The first wrapper 4 also includes an outbound pipe 16 configured to provide a second claimcheck data packet 18 derived from the second context message 14. Also shown in the fault processing system 2 of FIG. 1 is a claimcheck service module 20 configured to convert the first claimcheck data packet 8 into the first context message 12 and convert the second context message 14 into the second claimcheck data packet 18. That is, the fault processing system 2 of FIG. 1 may be configured to receive a claimcheck data packet 8 at the inbound pipe 6 and provide a distinct claimcheck data packet 18 at an outbound pipe 16, allowing the fault processing system 2 to interact with other fault processing systems via a series (or parallel configuration) of pipes and processing engines as will be described further herein. Each fault processing system 2 disclosed herein is configured to receive a claimcheck data packet 8, which includes a claim check token. The claim check token within the claimcheck data packet 8 is significantly smaller (e.g., a fraction) in terms of data size than the first context message 12, and the claim check token only includes information sufficient to allow the claimcheck service module 20 to identify and provide the first context message 12. The first context message 12 includes the specific fault data needed for the processing engine component 10 to process according to its determined fault processing rule. For example, where the fault processing rule ("process" command in FIG. 1) in processing engine 10 is a fault detection rule, the first context message 12 may include data about fault component identification, fault impedance values, nature of fault information etc. Where the fault processing rule ("process" command in FIG. 1) in processing engine 10 is a fault location rule, the first context message 12 may include data including network topology, line impedance values, fault indicator values etc. Where the fault processing rule ("process" command in FIG. 1) in processing engine 10 is a fault isolation rule, the first context message 12 may include data about network topology, current switch states (open/closed) etc. Where the fault processing rule ("process" command in FIG. 1) in processing engine 10 is a fault restoration rule, the first context message 12 may include data about energy consumers, alternate power sources, current switch states (open/closed), identification of automatic switches, etc.

It is understood that for each type of context message 12, the processing engine 10 may perform a specific action upon the data in the context message 12 based upon the fault restoration rule. For example, in the case that the fault processing rule is a fault location rule, the processing engine 10 may add location information to the first context message 12 to build the second context message 14 (which includes the additional location information). Where the fault processing rule is a fault restoration rule, the processing engine 10 may add switching plan data to the first context message 12 to build the second context message 14. Other fault processing rules in distinct processing engines 10 may perform different functions (e.g., adding distinct data) to a first context message 12 to build the second context message 14. After building the second context message 14, the processing engine may provide that message to the claimcheck service module 20, which may provide a new claimcheck data packet (e.g., claimcheck data packet 18) including a token representing the second context message 14.

In any case, it is understood that the fault processing system 2 may be configured to obtain a relatively small data packet in the form of a claimcheck data packet 8. In some embodiments, the claimcheck data packet 8 is only of a size big enough to guarantee the data packet's uniqueness. In one implementation, this claimcheck data packet 8 is approximately 20 bytes, however, other implementations may use claimchecks that are slightly larger or smaller. The total data packet (i.e. message) size consists of the claimcheck size plus the overhead that the messaging system uses for headers, etc., Here, the claimcheck acts as the token. In any case, the fault processing system 2 may further obtain only specific data (as a first context message 12) required by the processing engine 10 from the claimcheck service module 20 in order to process the fault data. As such, claimcheck data packets (e.g., 8, 18 and others described herein) may be transmitted between processing engine wrappers (e.g., processing engine wrapper 4) using less transmission capacity than in the case of an entire context message (e.g., context message 12). In one embodiment, the processing engine wrapper 4 may be configured to process the first context message 12 according to only one fault processing rule. In practice, a plurality of processing engine wrappers 4 may be used collectively (e.g., in parallel or in series), to process distinct portions of fault event data held at a claimcheck service module 20.

As noted herein, in some embodiments, a set of processing engine wrappers (similar to processing engine wrapper 4) may be connected (e.g., in series or in parallel) to process distinct portions of failure event data in an electrical power network. In contrast to conventional approaches to FDIR, aspects of the invention provide for fault processing systems 2 (including processing engine wrappers 4) that perform specific processing of an inbound context messages (e.g., first context message 12) via a specific rule, and provide a processed outbound context message (e.g., second context message 14).

As will be appreciated by one skilled in the art, the fault processing systems described herein may be embodied as a system(s), method(s) or computer program product(s), e.g., as part of a fault processing system(s). Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Magik, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to data flow illustrations and/or block diagrams of methods, apparatus (systems) and computer program products according to embodiments of the invention. It will be understood that each block of the data flow illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
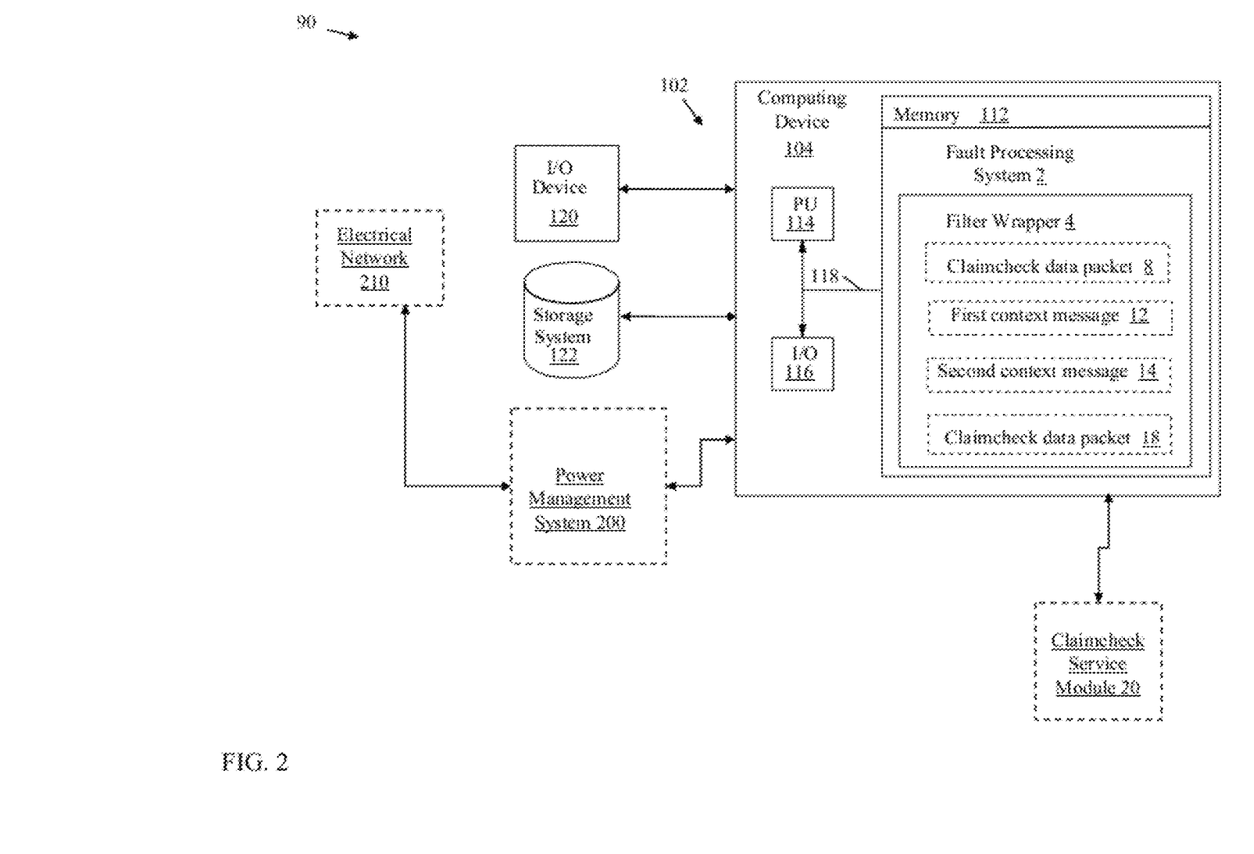
FIG. 2 shows an illustrative environment including a fault processing system according to embodiments of the invention.

Turning to FIG. 2, an illustrative environment 90 including a fault processing system(s) 2 is shown according to embodiments of the invention. Environment 90 includes a computer infrastructure 102 that can perform the various processes described herein. In particular, computer infrastructure 102 is shown including a computing device 104 that comprises the fault processing system 2, which enables computing device 104 to process a fault detected in an electrical network 210.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as fault processing system(s) 2, that is stored in memory 112 and/or storage system 122. While executing computer program code, processor 114 can read and/or write data, such as claimcheck data packet 8, first context message 12, second context message 14 and/or claimcheck data packet 18, to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In some embodiments, as shown in FIG. 1, environment 90 may optionally include a conventional power management system 200 linked with the electrical network 210, a conventional supervisory control and the claimcheck service module 20, operably connected to the fault processing system(s) 2 through computing device 104 (e.g., via wireless or hard-wired means). In some embodiments, these components may be linked with one another (e.g., via wireless or hard-wired means). It is understood that fault processing system(s) 2 may include conventional transmitters and receivers for transmitting and receiving, respectively, data from the power management system 200 (and, consequently, the electrical network 210), and/or the claimcheck service module 20.

In any event, computing device 104 can comprise any general purpose computing article of manufacture capable of executing computer program code installed by a user (e.g., a personal computer, server, handheld device, etc.). However, it is understood that computing device 104 and fault processing system(s) 2 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, fault processing system(s) 2 has the technical effect of enabling computing infrastructure 102 to perform, among other things, fault processing functions described herein. It is understood that some of the various components shown in FIG. 2 can be implemented independently, combined, and/or stored in memory for one or more separate computing devices that are included in computer infrastructure 102. Further, it is understood that some of the components and/or functionality may not be implemented, or additional schemas and/or functionality may be included as part of environment 90.

Figure 3:
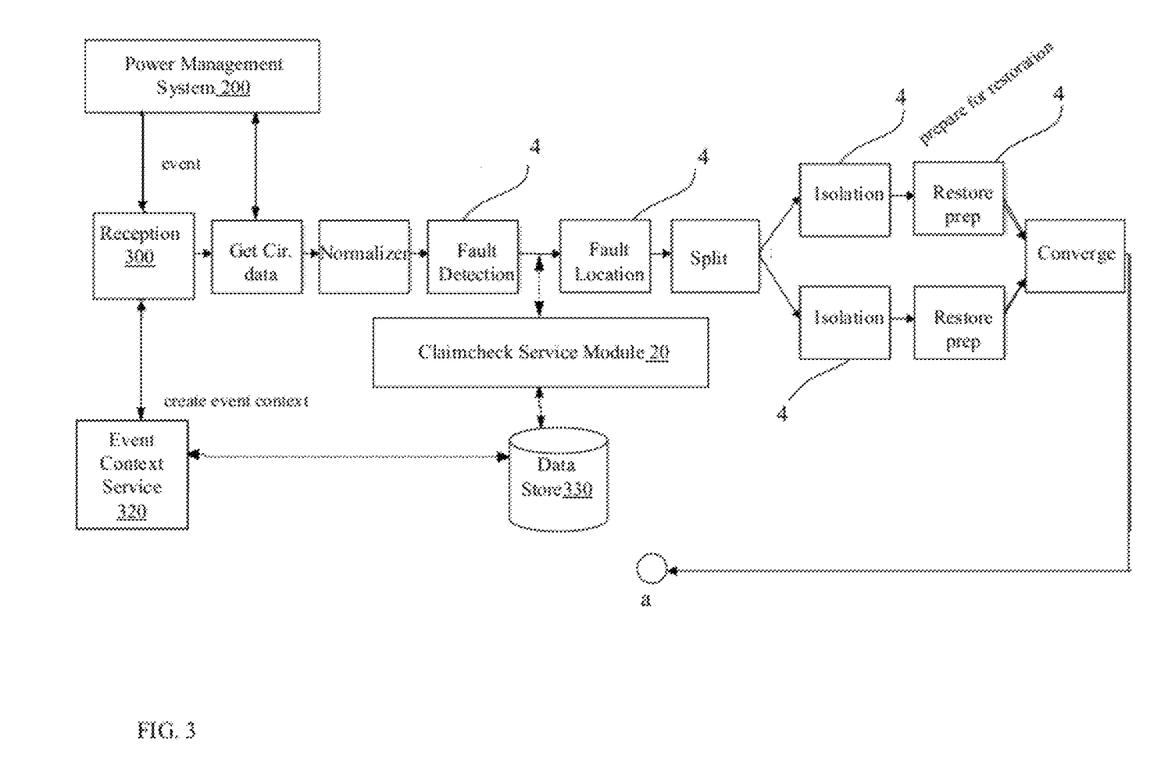
FIGS. 3-4 show schematic process flow diagrams illustrating a method according to embodiments of the invention.
Figure 4:
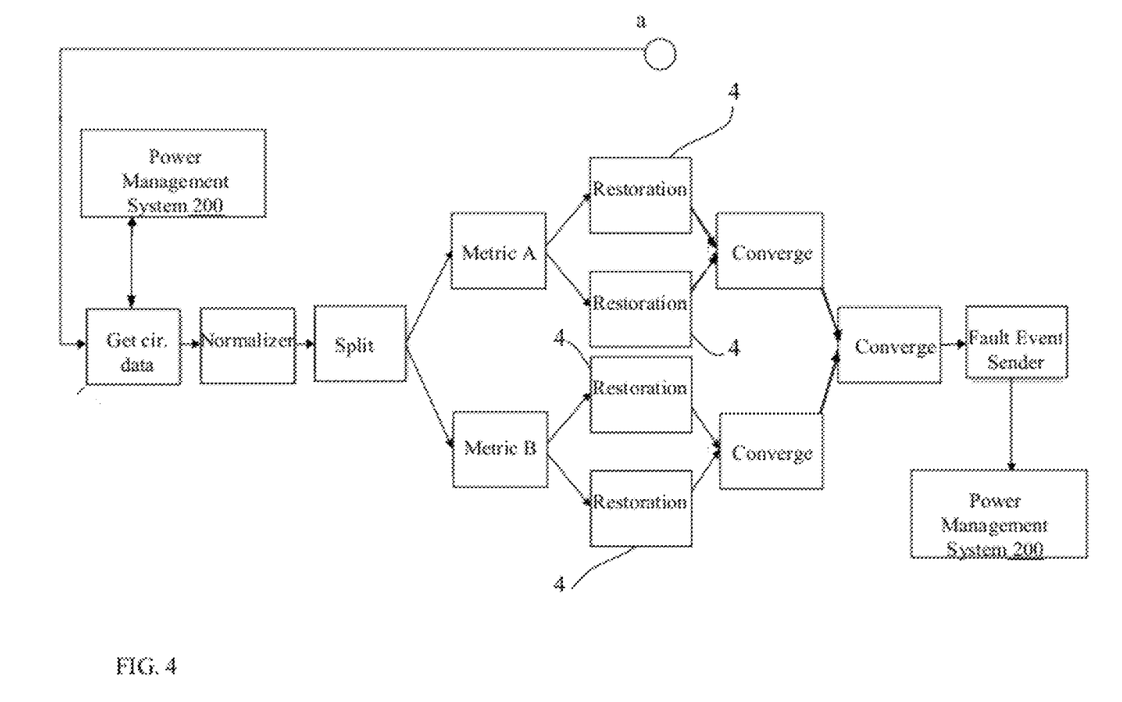
Figure 5:
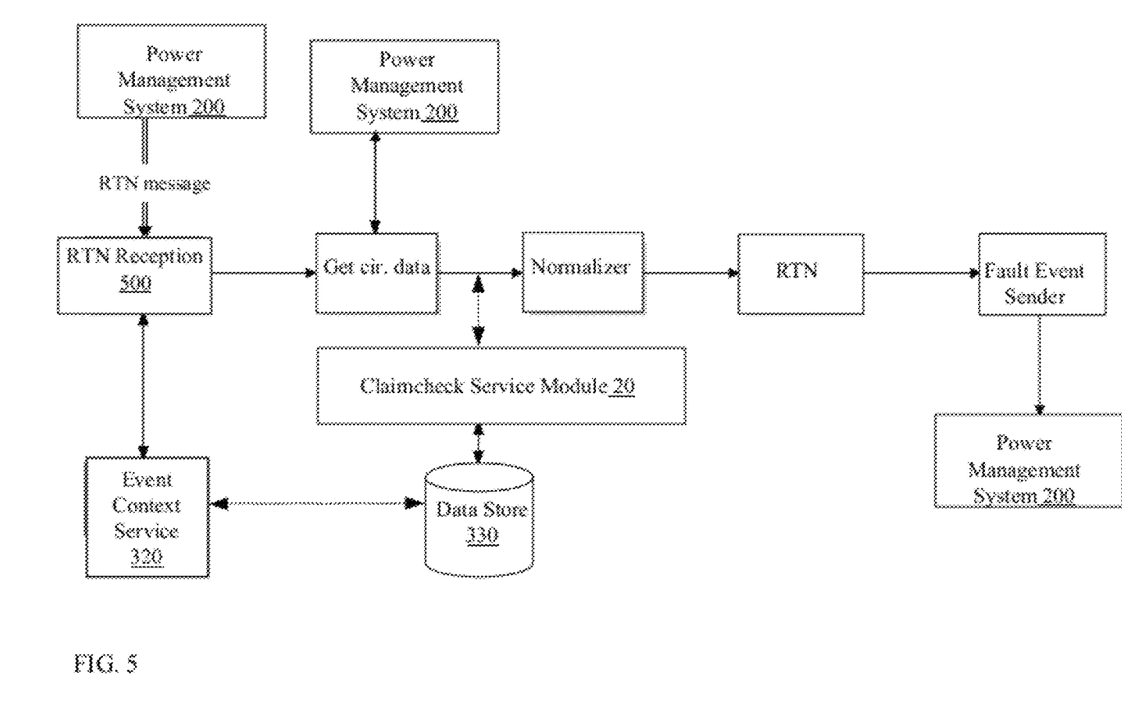
FIG. 5 shows a schematic process flow diagram illustrating a method according to embodiments of the invention.

Turning to FIGS. 3-5, schematic illustrations of process flows (including objects) are shown according to embodiments of the invention. Overall, aspects of the invention may include a system (e.g., a fault processing system 2) comprising: at least one computing device (e.g., computing device 104) adapted to process a power system fault (e.g., a fault in electrical network 210) by performing actions comprising: obtaining an inbound event context message indicating a fault in a power system component; obtaining circuit information about a circuit surrounding the power system component; providing instructions for normalizing the circuit surrounding the power system component; validating the event context message; determining a plurality of possible fault locations in the normalized circuit surrounding the power system component; generating an isolation plan for at least one of the plurality of possible fault locations; identifying a plurality of tie switches capable of providing restoration power to a portion of the power system downstream of the normalized circuit; obtaining circuit information about a circuit surrounding each of the plurality of tie switches; normalizing the circuit surrounding each of the plurality of tie switches; and generating a power restoration plan utilizing at least one of the plurality of tie switches based upon a predetermined power supply criteria. Additionally, the at least one computing device may be configured to implement the power restoration plan and implementing a return to normal operation after the generating of the power restoration plan.

FIGS. 3-4 illustrate portions of the above-described fault-detection, isolation and restoration (FDIR) approach, and FIG. 5 illustrates portions of a return-to-normal (RTN) approach, according to embodiments of the invention. As shown in FIG. 3, a first process may include receiving a fault event (e.g., a fault event ticket) from power management system 200 at a reception module 300. After receiving the fault event, the reception module 300 may call the event context service 320 to generate an event context for the fault event (which may be stored in an event context database 330. The event context will include data such as an identification of which device triggered the fault (a component ID). The component ID then allows for retrieval of circuit information from the power management system 200 about the portions of the power circuit surrounding the faulty component. After retrieving that circuit information, the circuit surrounding the faulty component may be normalized according to conventional methods (e.g., by converting the circuit information to an internal representation used by all the processing engines). Following normalizing of the circuit surrounding the component, a fault detection processing engine wrapper (e.g., similar to processing engine wrapper 4) may validate the fault, as described with reference to FIG. 1.

Following validation of the fault, a fault location processing engine wrapper (e.g., similar to processing engine wrapper 4) may identify all possible fault locations (e.g., those locations causing the fault reading in the component ID). This may include using fault indicators, impedance values, etc., for components within the circuit surrounding the faulty component to determine all possible fault locations. For each of these fault locations (indicated as a two-way split in FIG. 3 for simplicity of illustration), a fault isolation processing engine wrapper (e.g., similar to processing engine wrapper 4) generates an isolation plan (a power isolation plan) for the area surrounding the specific fault location. It is understood that this may be performed across a plurality of locations, and not simply the two illustrated in FIG. 3. After each of the isolation plans have been generated, a fault restoration planning processing engine wrapper (e.g., similar to processing engine wrapper 4) may prepare a restoration plan for each of the areas identified by the fault isolation processing engine wrapper. Following this process, the method may converge and proceed as shown in FIG. 4 (via linking node a).

Turning to FIG. 4, following preparation of the restoration plan for each of the potential fault locations (involving their surrounding circuitry), circuit data may be retrieved from the power management system 200 about the portions of the power circuit surrounding the circuits which surround each potential fault locations. That is, in this process, a second level of surrounding circuitry data may be retrieved from the power management system 200 to determine characteristics of the areas surrounding the circuits surrounding each potential fault location. After retrieving this data from the power management system 200, each of these circuits may be normalized according to conventional methods. Following normalization of the circuit(s), the process may include another split—where for each location, the following is performed: for each of a group of restoration metrics A, B, C, etc., (predetermined criteria for power supply to particular components, including power demand, time, responsiveness, etc.), a fault restoration processing engine wrapper (e.g., similar to processing engine wrapper 4) may develop restoration plans for each of the group of metrics A, B, C, etc. It is understood that the fault restoration processing engine wrapper may develop these plans in parallel, due to the independence of the processing engine wrappers (as described herein with reference to processing engine wrapper 4).

It is understood that the restoration metrics may be derived from rules that require certain portions of the power system to receive power supply over others. For example, one possible restoration metric (rule) may include: restore as much total power as possible; restore power to as many users (locations) as possible; restore power to critical locations (e.g., health care centers) before others, etc.

After the restoration plans have been generated, the plans may be grouped and provided to a conventional fault event sender for providing to the power management system 200. The power management system 200 may then coordinate one or more of the restoration plans on the electrical network 210 (FIG. 2) in order to effectively perform the desired FDIR functions. In one embodiment, the power management system 200 may utilize the restoration plans in order to generate a plurality of return-to-normal (RTN) plans that allow for an RTN operation on the electrical network 210 after conclusion of the FDIR process.

FIG. 5 illustrates a return to normal (RTN) operation according to aspects of the invention. The operation may involve an RTN reception module 500 obtaining an RTN message from the power management system 200, along with an event context message from the event context service 320. After obtaining the RTN message and the event context message, the process may include obtaining circuit data (e.g., from the power management system 200), normalizing the circuit outlined in the RTN message, and performing an RTN operation on that circuit, according to conventional methods. Following the RTN operation, a fault event sender module may provide updated power system information (e.g., information indicating the fault has been rectified and the system has returned to normal) to the power management system 200 for storage and/or subsequent use.

The data flow diagram and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., temperatures, grid frequency, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fault processing system comprising:
a first processing engine wrapper having:
an inbound pipe configured to obtain a first claimcheck data packet comprising a first claimcheck token;
a processing engine component configured to:
process a first context message, the first context message being identified using the first claimcheck token, according to a fault rule included in the processing engine component, wherein the fault rule is selected from: a fault detection rule, a fault location rule, a fault isolation rule, or a fault restoration rule, wherein the first claimcheck token within the claimcheck data packet is smaller than the first context message in terms of data size; and
generate a second context message, the second context being generated by adding data processed according to the selected fault rule to the first context message; and an outbound pipe configured to provide a second claimcheck data packet derived from the second context message and including a second claimcheck token for identifying the second context message, wherein the second claimcheck token within the claimcheck data packet is smaller than the second context message in terms of data size.

2. The fault processing system of claim 1, further comprising a claimcheck service module configured to:

convert the first claimcheck data packet into the first context message; and convert the second context message into the second claimcheck data packet.

3. The fault processing system of claim 2, wherein the inbound pipe is configured to route the first claimcheck data packet through the claimcheck service module.

4. The fault processing system of claim 3, wherein the claimcheck service module is configured to provide the second claimcheck data packet to the outbound pipe.

5. The fault processing system of claim 1, wherein the processing engine component of the first processing engine wrapper is configured to process the first context message according to only the selected fault rule.

6. The fault processing system of claim 1, wherein the inbound pipe and the outbound pipe are configured to transmit only a claimcheck data packet.

7. The fault processing system of claim 1, further comprising a second processing engine wrapper connected with the first processing engine wrapper, the second processing engine wrapper having:
an inbound pipe configured to obtain a first claimcheck data packet comprising a first claim check token from the outbound pipe of the first processing engine wrapper;
a processing engine component configured to:
process a first context message, the first context message being identified using the first claimcheck token, according to a fault rule included in the second process engine wrapper processing engine component that is distinct from the fault rule of the first processing engine wrapper processing engine component, selected from: a fault detection rule, a fault location rule, a fault isolation rule, or a fault restoration rule, wherein the first claimcheck token within the claimcheck data packet is smaller than the first context message in terms of data size; and
generate a second context message, the second context message being generated by adding data processed according to the selected fault rule to the first context message; and
an outbound pipe configured to provide a second claimcheck data packet derived from the second context message and including a second claimcheck token for identifying the second context message, wherein the second claimcheck token within the claimcheck data packet is smaller than the first context message in terms of data size.

8. The fault processing system of claim 7, wherein the processing engine component of the second processing engine wrapper is configured to process the first context message according to only the selected fault rule.

9. A fault processing system comprising:
a series of connected processing engine wrappers collectively configured to process a fault in a power system, each of the processing engine wrappers having:
an inbound pipe configured to obtain a first claimcheck data packet comprising a first claimcheck token;
a processing engine component configured to:
process a first context message, the first context message being identified using the first claimcheck token, according to a fault rule included in the processing engine component, wherein the fault rule is selected from: a fault detection rule, a fault location rule, a fault isolation rule, or a fault restoration rule, wherein the first claimcheck data packet is smaller than the first context message in terms of data size; and
generate a second context message, the second context message being generated by adding data processed according to the selected fault rule to the first context message; and
an outbound pipe configured to provide a second claimcheck data packet derived from the second context message and including a second claimcheck token for identifying the second context message to a subsequent processing engine wrapper in the series of processing engine wrappers, wherein the second claimcheck token within the claimcheck data packet is smaller than the first context message in terms of data size.

10. The fault processing system of claim 9, wherein each of the series of processing engines further comprises a claimcheck service module configured to:
convert the first claimcheck data packet into the first context message; and
convert the second context message into the second claimcheck data packet.

11. The fault processing system of claim 10, wherein the inbound pipe is configured to route the first claimcheck data packet through the claimcheck service module.

12. The fault processing system of claim 11, wherein the claimcheck service module is configured to provide the second claimcheck data packet to the outbound pipe.

13. The fault processing system of claim 10, wherein the inbound pipe and the outbound pipe of each of the series of processing engine wrappers are configured to transmit only a claimcheck data packet.

14. The fault processing system of claim 11, wherein each of the series of processing engine components is configured to process the first context message according to a distinct selected fault rule from a remainder of the series of processing engine components.

15. A system comprising:
at least one computing device adapted to process a power system fault by performing actions comprising:
obtaining an inbound fault event ticket indicating a fault in a power system component; generating an event context message from the fault event ticket; obtaining circuit information about a circuit surrounding the power system component;
providing instructions for normalizing the circuit surrounding the power system component;
validating the event context message;
determining a plurality of possible fault locations in the normalized circuit surrounding the power system component;
generating an isolation plan for at least one of the plurality of possible fault locations;
identifying a plurality of tie switches capable of providing restoration power to a portion of the power system downstream of the normalized circuit;
obtaining circuit information about a circuit surrounding each of the plurality of tie switches;
normalizing the circuit surrounding each of the plurality of tie switches; and
generating a power restoration plan utilizing at least one of the plurality of tie switches based upon a predetermined restoration metric.

16. The system of claim 15, wherein the at least one computing device is further configured to process the power system fault by performing actions comprising:
implementing the power restoration plan.

17. The system of claim 15, wherein the at least one computing device is further configured to process the power system fault by performing actions comprising:
implementing a return to normal operation after the generating of the power restoration plan.

* * * * *